J. L. H. HAND.
COVER FOR NAVIGATION INSTRUMENTS.
APPLICATION FILED DEC. 23, 1911.
1,092,645.
Patented Apr. 7, 1914.
2 SHEETS—SHEET 1.
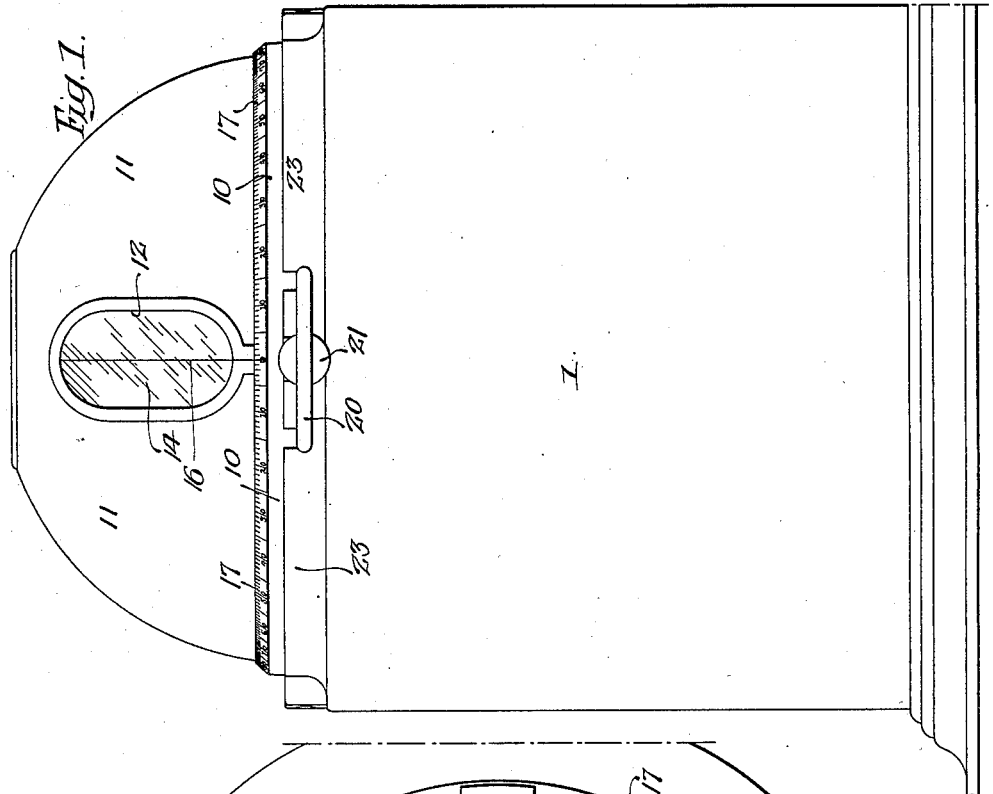
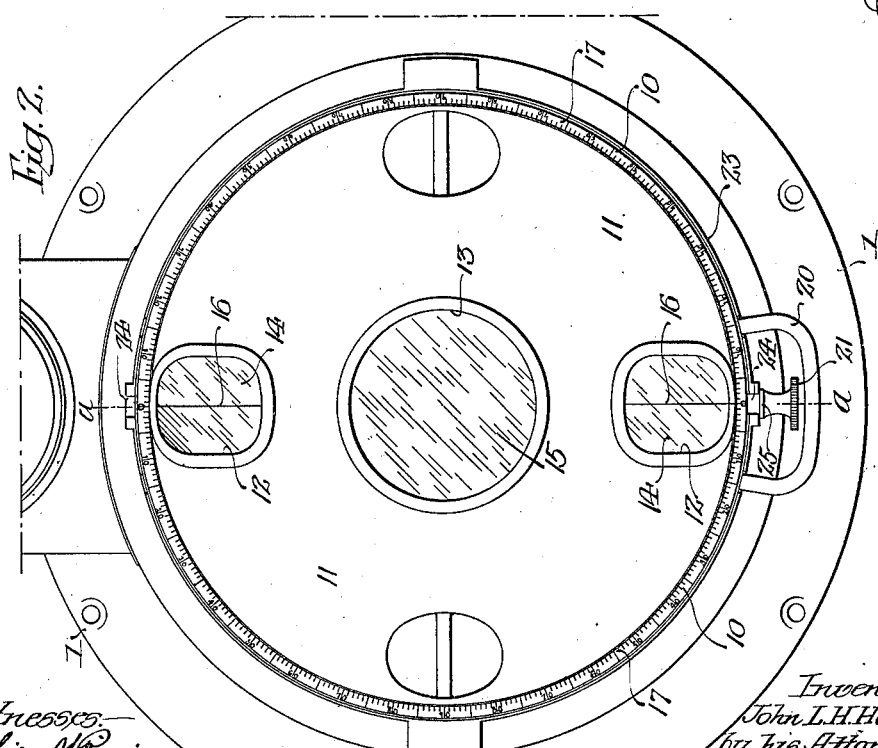

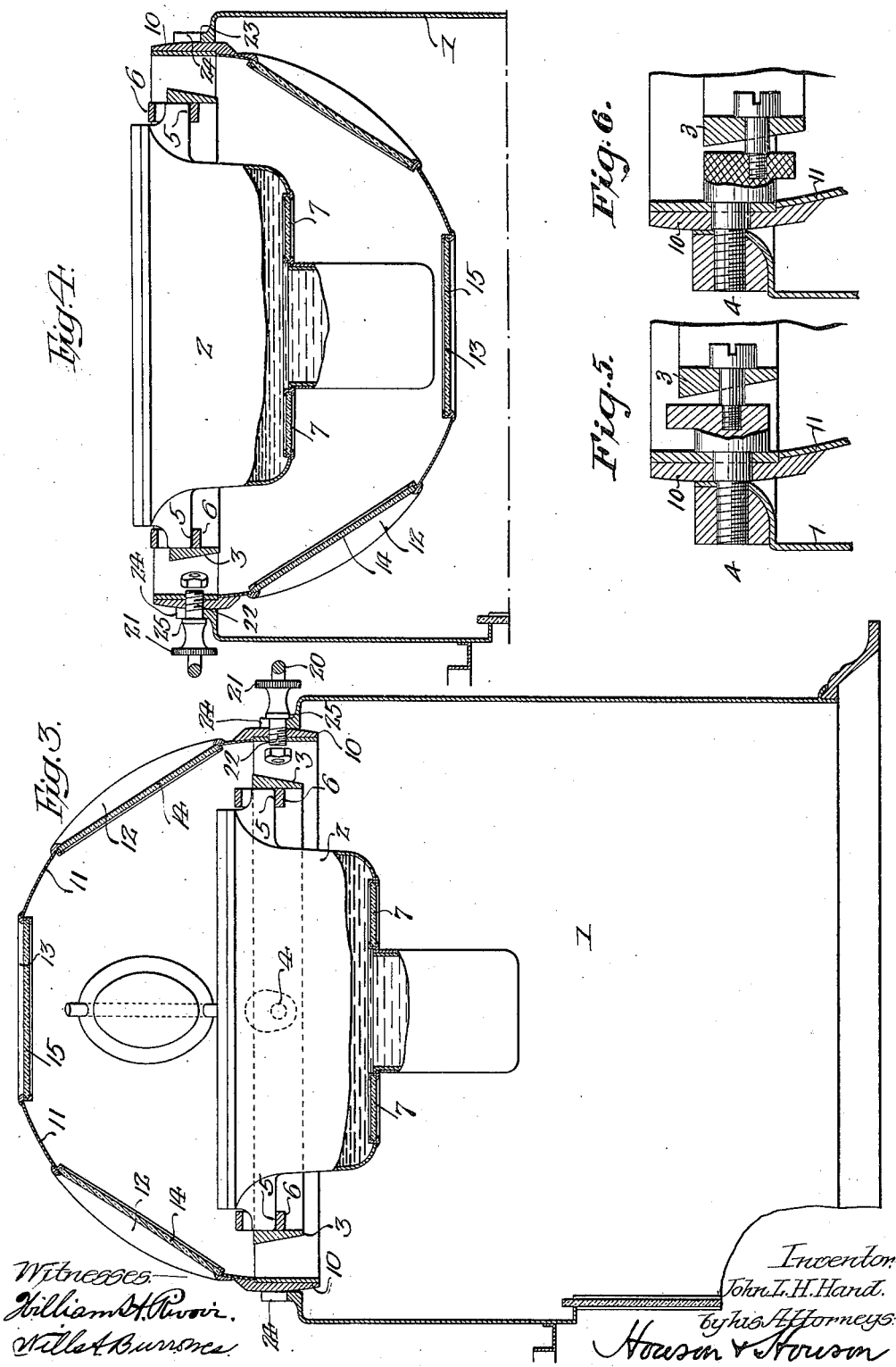

UNITED STATES PATENT OFFICE.

JOHN L. H. HAND, OF ATCO, NEW JERSEY.

COVER FOR NAVIGATION INSTRUMENTS.

1,092,645. Specification of Letters Patent. Patented Apr. 7, 1914.

Application filed December 23, 1911. Serial No. 667,559.

*To all whom it may concern:*

Be it known that I, JOHN L. H. HAND, a citizen of the United States, and a resident of Atco, Camden county, New Jersey, have invented certain Improvements in Covers for Navigation Instruments, of which the following is a specification.

My invention relates to casings or covers for navigation instruments; and the object of my invention is to provide a binnacle or pelorus stand, in which a compass or pelorus is mounted, with a cover that is movable with respect to either of such instruments, but not removable from the binnacle or pelorus stand proper.

Other features of my invention are more fully described hereinafter, reference being had to the accompanying drawings, in which:

Figure 1, is an external view of a binnacle provided with a cover made in accordance with my invention; Fig. 2, is a plan view of the structure shown in Fig. 1; Fig. 3, is a sectional view on the line a—a, Fig. 2, showing the structure closed with the cover in the raised or inclosing position, Fig. 4, is a similar sectional view showing the structure open and the cover in the lowered position, and Figs. 5 and 6, are sectional views illustrating details of my invention.

During stormy weather it is highly essential that the compass, pelorus and other navigation instruments be inclosed, and binnacle covers have been employed for this purpose. The covers heretofore made, however, have been objectionable because they were constructed to be bodily removed from the binnacle or pelorus stand and when not in use were in the way.

My invention comprises a cover available for use with a binnacle or pelorus stand and one that is movable with respect to such binnacle or pelorus stand so that the compass, pelorus or other instrument may be covered, or fully exposed, at the will of the navigator; such cover forming part of the structure, however, so that while it is always available for use, it is never in the way when not in use.

In the accompanying drawings, 1 represents a binnacle or pelorus casing, and 2 an ordinary compass of the liquid type mounted in a suitable form of universal bearings so that it may find its level under all circumstances. In the particular structure shown herewith, a ring 3 is trunnioned at 4 in the casing 1; such ring providing for oscillating movement of the compass in one plane, and for movement in a plane at right angles thereto, the shell of the compass 2 is provided with knife-edged supports 5 adapted to bearings 6 carried by said ring 3. The compass structure may have a transparent bottom 7 for a purpose to be described hereinafter.

Suitably journaled on the trunnions 4 supporting the ring 3, is a ring 10, and this ring carries a shell 11, substantially semi-circular in cross-section forming a cover, which may have oppositely disposed apertures 12 and a centrally disposed aperture 13, all of which apertures are preferably fitted with transparent material, glass for instance, as indicated at 14 and 15, respectively. The cover is movable on the trunnion 4, to cover or uncover the compass or other navigation instrument, as shown in Figs. 3 and 4. The several sight openings 12 and 13 permit the ready reading of the compass during bad weather when the cover is in the raised position, and the glasses 14 closing the openings 12 are provided with hair lines 16 whereby the desired course may be indicated and maintained. The hair lines, when in the normal position with respect to the binnacle, are in line with the keel of the boat.

The ring or rim 10 carrying the cover is provided with a scale 17, which may have markings from 0° to 90°, each way from the imaginary keel line or the hair lines 16, or from 0° to 360°, or other markings as may be desired. The cover is so mounted in the ring 10 that it may be rotated with respect to this scale so that with the aid of the hair lines on the sight glasses any course desired may be laid down and steered.

To shift the cover from the open to the closed position, or vice versa, a handle 20 may be provided. Carried by the rim of the cover, with its head disposed within this handle, is a lock screw 21 having a shank 22 threaded into said rim. The rim 23 of the casing in which the cover is trunnioned is notched at 24 on opposite sides for the reception of this screw so that the cover may be brought to the fully open or fully closed position and held in such position therein. When in either of said positions a shoulder 25 on said screw engages the walls of said notched portions and maintains the cover relatively fixed with respect thereto.

As before mentioned, the compass is provided with a transparent bottom 7, and this feature is intended to permit illumination of the same at night. The source of illumination will be disposed at the bottom of the binnacle casing, or if not at such point, will enter from a point below the same, and such light will illuminate the compass card from below by passing through the transparent bottom of the compass shell or casing. By providing the cover with the top sight glass 15 as indicated, proper illumination of the compass when my improved cover is employed is fully assured.

Instead of mounting the scale upon the fixed rim, it may be carried by the cover, while the imaginary keel line can be disposed on the rim. The trunnions carrying the cover are on the same axis as the trunnions for the outer ring support for the compass.

I claim:

1. A binnacle or pelorus stand comprising a substantially circular shell forming a closed casing, a navigation instrument mounted therein, and a cover journaled on said casing and movable to closed and opened positions respectively, said cover passing into the casing when the navigation instrument is exposed.

2. A binnacle or stand comprising a substantially circular shell forming a closed casing, a navigation instrument trunnioned therein, and a cover journaled on the same axis as the navigation instrument and movable to closed and opened positions respectively.

3. A binnacle or navigation instrument stand, a navigation instrument mounted therein, and a cover comprising a trunnioned ring and a shell, said shell being rotatable with respect to said ring and the ring being movable on its trunnions to expose or inclose the navigation instrument.

4. The combination with a binnacle or navigation instrument stand, of a cover, a trunnioned ring carrying said cover, and a scale carried by said ring, said cover having a keel line marking.

5. The combination with a binnacle or navigation instrument stand, of a cover journaled therein and movable with respect to the same, said cover having sight openings, two of which are oppositely disposed, and transparent material closing said sight openings, said oppositely disposed sections of transparent material having hair lines.

6. The combination with a binnacle or navigation instrument stand, of a cover trunnioned thereto and movable with respect to the same, a navigation instrument carried by said binnacle or stand and constructed for the admission of light from below, and a sight glass carried by said cover whereby the illumination from below will not be cut off when the cover is in the lowered or open position.

In testimony whereof, I have signed my name to this specification, in the presence of two subscribing witnesses.

JOHN L. H. HAND.

Witnesses:
MURRAY C. BOYER,
WM. A. BARR.